United States Patent [19]

Cho

[11] Patent Number: 5,570,198

[45] Date of Patent: Oct. 29, 1996

[54] PAID BROADCAST RECEIVING DEVICE WITH CONNECTION DETECTING CAPABILITY

[75] Inventor: Hyun-gi Cho, Suwon, Rep. of Korea

[73] Assignee: Samsung Electronics Co., Ltd., Kyungki-do, Rep. of Korea

[21] Appl. No.: 281,090

[22] Filed: Jul. 27, 1994

[30] Foreign Application Priority Data

Jul. 27, 1993 [KR] Rep. of Korea ................... 1993-14068

[51] Int. Cl.[6] ...................................................... H04N 5/76
[52] U.S. Cl. .............................. 386/46; 348/705; 380/5; 386/113
[58] Field of Search ....................... 358/335, 342, 358/906; 360/60, 61; 348/705, 706, 632, 633; 380/5, 19, 20; H04N 5/76

[56] References Cited

U.S. PATENT DOCUMENTS

| | | | |
|---|---|---|---|
| 4,774,575 | 9/1988 | Takayama | 358/335 |
| 4,995,079 | 2/1991 | Kim | 380/20 |
| 5,040,076 | 8/1991 | Tenma | 358/321 |
| 5,091,787 | 2/1992 | Watanabe et al. | 358/906 |
| 5,208,517 | 5/1993 | Beppu | 315/364 |

*Primary Examiner*—Thai Q. Tran
*Assistant Examiner*—Y. Lee
*Attorney, Agent, or Firm*—Sughrue, Mion, Zinn, Macpeak & Seas

[57] ABSTRACT

A paid broadcast receiving device has a decoder connection detector for determining whether or not a video cassette recorder (VCR) and a canal+ decoder are connected. The determination depends on an impedance match between the VCR and decoder when a canal+ broadcast channel is selected after the canal+ channel is stored in a system where a VCR is to be connected to a canal+ decoder and a television. The system thereby receives and/or records canal+ broadcasts without a decoder, for paid broadcasts sent via a public line, even if the canal+ decoder is not connected to the VCR. Users are able to easily judge whether or not the canal+ decoder is connected.

5 Claims, 2 Drawing Sheets

PAID BROADCAST RECEIVING DEVICE WITH CONNECTION DETECTING CAPABILITY

BACKGROUND OF THE INVENTION

The present invention relates to a receiving device for receiving a paid broadcast, and more particularly, to a paid broadcast receiving device which can detect whether or not a paid broadcast decoder and receiver are interconnected.

In recent times, as the prevalence of paid broadcast programs is increasing in some European countries, e.g., Germany, Spain and France, there has arisen a need for adding a jack to a video apparatus so that a decoder can be connected thereto for unscrambling the scrambled broadcast signals. In a color television set or VCR for receiving SECAM television broadcasts, a canal+ jack (21 pin scart-jack) can be added so as to connect a canal+ decoder (also known as a "paid broadcast decoder") for receiving the paid broadcast programs.

A canal+ channel system or a canal+ broadcast system is a system which can receive and display a transmitted signal only when a decoder for decoding the scrambled broadcast signal transmitted from a broadcast station is provided, and is a paid broadcast system ordinarily using a radio frequency (RF) signal. The canal+ broadcast system decodes and receives the coded broadcast signal via a canal+ decoder. There are basically two paths for receiving canal+ broadcasts: a television canal+ (TV canal+) and a video cassette recorder canal+ (VCR canal+).

The TV canal+ is a path wherein a scrambled canal+ broadcast received through a television tuner is unscrambled via a canal+ decoder connected to a VCR, with the result being input to the television while the VCR power is off (on standby power). Here, the power provided to the VCR can be classified as "standby" power, "power-on" power, "PB" power for playback, and "REC" power for recording.

On the other hand, the VCR canal+ path is one through which a canal+ broadcast input to a VCR tuner is transmitted to a canal+ decoder for unscrambling the canal+ broadcast signal, with the VCR in the "power-on" state. The unscrambled result is recorded by the VCR while viewed as a general broadcast signal on the television. Alternatively, a path is provided through which a general broadcast signal is recorded by the VCR and the canal+ broadcast received by the television is decoded by the canal+ decoder connected to the VCR with the decoded result being received at the television's AV port via an AV jack for connection to the VCR.

FIG. 1 is a block diagram showing a conventional receiver for receiving a canal+ broadcast signal.

In canal+ broadcast receiving devices such as a VCR 1 and a television 3, a canal+ decoder 2 can be directly connected to either VCR 1 or television 3. Here, canal+ decoder 2 is connected to VCR 1 which also is connected to television 3, thereby enabling reception of the scrambled signal or general broadcast signal. That is, the above-mentioned TV canal+ and VCR canal+ paths have to be satisfied in order to receive a canal+ broadcast, by connecting VCR 1 to both television 3 and canal+ decoder 2.

Referring to FIG. 1, the input of a first tuner 11 of VCR 1 is connected to an antenna (ANT) and its output is connected to the input of a first demodulator 12.

A contact "b" of a first switch SW1 is connected to the output of first demodulator 12, and a contact "c" thereof is connected to the AV input terminal of VCR 1. An output terminal "a" of first switch SW1 is connected to the input of a first amplifier 13 whose output is connected to the video input terminal of canal+ decoder 2. Reference numeral 4 denotes a canal+ jack for connecting VCR 1 to canal+ decoder 2.

Contacts "b," "c," "d" and "e" of a second switch SW2 are connected to the output of first demodulator 12, the AV input terminal, the line input terminal of VCR 1, and the video output terminal of canal+ decoder 2, respectively. An output terminal "a" of second switch SW2 is connected to the input of a first video signal processor 14 whose output is connected to the input terminals of a second amplifier 15 and a recorder/reproducer 17.

Contact "c" of a third switch SW3 is connected to the output of second amplifier 15, and contact "b" thereof is connected to the video output terminal of canal+ decoder 2. An output terminal "a" of third switch SW3 is connected to the AV output terminal of VCR 1 and one input of a modulator 18 whose other input is connected to the output of a power supply 19.

To the above first, second and third switches SW1, SW2 and SW3, a microcomputer 16 provides a canal+ position signal, first and second selection signals, and a VCR/TV mode control signal, respectively. The VCR/TV mode control signal output port of microcomputer 16 is connected to the control terminal of third switch SW3, to the control input of power supply 19 and to the AV control output terminal (AV CTL) of a canal jack 5 via a diode D2. The first and second selection signal output ports are connected to the control terminal of second switch SW2 via third and fourth diodes D3 and D4. The canal+ position output port is connected to the control terminal of first switch SW1. Diodes D5 and D6 are respectively connected between diodes D3 and D4 and the canal+ position output port of microcomputer 16.

The input of a second tuner 31 of television 3 is connected to an RF output terminal 35 of VCR 3 which is connected to the antenna. The input of a second demodulator 32 is connected to the output of second tuner 31, while its output is connected to the AV input terminal of canal jack 5 and to the television signal input contact "c" of a fourth switch SW4, i.e., the VCR/TV mode selection switch. The VCR signal input contact "b" of fourth switch SW4 is connected to the AV output terminal of canal jack 5, and an output terminal "a" thereof is connected to the input of a second video signal processor 33 whose output is connected to a Braun tube 34. The control terminal of fourth switch SW4 is connected to the AV control output terminal of canal jack 5.

Now, the operation of the receiving device shown in FIG. 1 will be explained with reference to the following Table 1.

TABLE 1

|  | VCR mode | | | television mode | |
| --- | --- | --- | --- | --- | --- |
|  | general broadcast | canal+ broadcast | general canal+ broadcast | canal+ broadcast | general broadcast |
| CP signal | L | H | H | L | L |
| AV CTL signal | L | H | L | H | L |
| SW1 contact | c | b | b | c | c |
| SW2 contact | b | e | e | c | c |

TABLE 1-continued

| | VCR mode | | | television mode | |
|---|---|---|---|---|---|
| | general broadcast | canal+ broadcast | general canal+ broadcast | canal+ broadcast | general broadcast |
| SW3 contact | c | c | c | b | b |
| SW4 contact | b | b | b | b | c |

Hereinbelow, the five basic conditions of Table 1 will be described.

(1) General broadcast reception in a VCR mode:

As this case is not a canal+ broadcast condition, the canal+ position (CP) signal and the AV control (AV CTL) signal of canal+ decoder 2 are both "low," and the relevant general broadcasting channel is received from the antenna and selected by using first tuner 11 of VCR 1. The received RF broadcast signal is then demodulated into a video signal by first demodulator 12. Since first switch SW1 is connected to contact "c" and second switch SW2 is connected to contact "b," the output of first demodulator 12 is processed in first video signal processor 14. The processed video signal is output to the AV output terminal via third switch SW3 being connected to contact "c" and set for VCR mode or is input to a recorder/reproducer 17 to be recorded. Since fourth switch SW4 is connected to contact "b" (VCR mode), the output of first video signal processor 14 is input to second video signal processor 33 and displayed on Braun tube 34. Accordingly, the general broadcast signal received via an antenna is signal-processed in VCR 1 and output to television 3 via the AV output terminal of canal jack 5, so that the signal can be viewed.

(2) Canal+ broadcast reception in a VCR mode:

First, when the user purchases a VCR and presets the initial broadcast reception channel, a canal+ broadcast channel is set and stored as the canal+ position channel. Then, when the stored canal+ position channel is selected, the canal+ position output port of microcomputer 16 is set "high." Accordingly, when a canal+ broadcast signal is received in the VCR mode, the canal+ position signal goes "high" and the AV control signal of canal+ decoder 2 also goes "high" to set first switch SW1 to contact "b" so that the tuned and demodulated video signal input is provided to the video input terminal of canal+ decoder 2 via first amplifier 13. The scrambled video signal input to canal+ decoder 2 is unscrambled and output to VCR 1 via video output terminal as a normal video signal. With the canal+ position signal set "high," the first and second selection control signals respectively output from microcomputer 16 are both forced "high," which sets second switch SW2 to contact "e." Accordingly, the unscrambled video signal is selected from the video output terminal of canal+ decoder 2 for input to first video signal processor 14 via second switch SW2. The selected and unscrambled canal+ broadcast signal goes through first video signal processor 14 and is output to television 3, similar to the case where the general broadcast signal is received in VCR mode, and is displayed on the television screen or input to recorder/reproducer 17 to be recorded.

(3) General canal+ broadcast reception in a VCR mode:

When a canal+ broadcast signal is received, as explained above (condition 2), first switch SW1 is connected to contact "b" and the received broadcast signal is provided to canal+ decoder 2. However, the scrambling of the input signal remains since the AV control signal of canal+ decoder 2 is "low," and the scrambled canal+ broadcast signal is input to first video signal processor 14 via second switch SW2 which is connected to contact "e" according to the first and second selection signals. The output of first video signal processor 14 is supplied to second video signal processor 33 for display, since third switch SW3 is connected to contact "c" and fourth switch SW4 is connected to contact "b."

(4) Canal+ broadcast reception in a television mode:

Since the canal position signal is "high" only when a canal+ broadcast is received in the VCR mode, in the case of condition 4, the canal position signal is "low" while the AV control signal of canal+ decoder 2 is "high." At this time, since first switch SW1 is connected to contact "c," the video input terminal of canal+ decoder 2 receives the output of second demodulator 32 of television 3. Thus, the broadcast channel selected via VCR 1 is actually a canal+ broadcast channel tuned in second tuner 31 and input to second demodulator 32. This canal+ broadcast signal demodulated by second demodulator 32 and selected by first switch SW 1 is amplified in first amplifier 13 and provided to canal+ decoder 2. Then, the thus-provided canal+ broadcast signal is unscrambled by canal+ decoder 2 and thereby converted to a normal broadcast signal to be supplied to second video signal processor 33 of television 3 via third switch SW3 connected to contact "b" and fourth switch SW4 connected to contact "b" according to the AV control signal output from canal+ decoder 2.

(5) General broadcast reception in a television mode:

The general broadcasting signal received by the antenna in the television mode is tuned and demodulated via second tuner 31 and second demodulator 32 of television 3. The demodulated output is provided directly to second video signal processor 33 for display, since fourth switch SW4 is connected to the television signal input contact "c" according to the VCR/TV mode control signal from microcomputer 16. Here, too, the canal+ position signal and the AV control signal of canal+ decoder 2 are both "low," since there is no canal+ broadcast reception. Also, first, second and third switches SW1, SW2 and SW3 are connected to their contacts "c," "c" and "b," respectively.

Meanwhile, second switch SW2 is connected to contact "d" if the select control signals output from the first and second selection control ports of microcomputer 16 are each "low" so as to select a video signal via the line input terminal of VCR 1. If the first and second select control signals are "low" and "high," respectively, second switch SW2 is connected to contact "b" in order to select a video signal which passes through the first tuner 11 and first demodulator 12 of VCR 1. Further, if these select control signals are "high" and "low," respectively, second switch SW2 is connected to contact "c" so as to select the output of second demodulator 32 input via the AV input terminal of canal jack 5, and if they are "high" and "high," respectively, second switch SW2 is connected to contact "e" so as to select the signal output from video output terminal of canal+ decoder 2.

In addition, a modulator 18 is enabled in the VCR mode and disabled in the television mode depending on the VCR/TV selection mode control signal which is preset by the user. Further, the user can override the operation of third and fourth switches SW3 and SW4 by the setting of VCR/TV selection mode. That is, the VCR mode fixes third switch SW3 to contact "c" and fourth switch SW4 to contact "b" while the television mode fixes third switch SW3 to contact "b" and fourth switch SW4 to contact "c."

In a conventional VCR as described above, if a canal+ broadcast signal is received in the VCR mode of condition 3 with the canal+ position channel stored, second switch SW2 is connected to contact "e" so as to select the canal+ decoder output even if there is no canal+ decoder connected to the VCR. Therefore, there is no path to receive any broadcast signal. Moreover, the unscrambled canal+ broadcasting channel cannot be recorded.

Furthermore, if a canal+ broadcast signal is received in the television mode of condition 5, when a canal+ broadcast channel is selected after storing the canal+ position channel, the broadcast signal of the canal+ broadcasting channel cannot be received via the television's tuner without a canal+ decoder being connected to the VCR. Moreover, the unscrambled canal+ broadcast channel cannot be viewed on the television screen.

Meanwhile, U.S. Pat. No. 4,995,079 discloses a canal+ decoder switch circuit for a VCR, invented by the applicant of the present invention. Here, a normal picture can be viewed even without manually connecting a canal+ decoder to the television when a canal+ broadcast signal is received in a television mode.

SUMMARY OF THE INVENTION

It is an object of the present invention to provide a paid broadcast receiver which can easily determine whether or not to connect a broadcast receiver and a paid broadcast decoder once the channel of the paid broadcast system is selected.

It is another object of the present invention to provide a paid broadcast receiver which can receive and/or record a paid broadcast signal introduced without passing through a decoder by determining whether or not to connect a broadcasting receiver and a paid broadcasting decoder when a paid broadcasting decoder is not connected upon selecting a channel of the paid broadcasting system.

It is still another object of the present invention to provide a connection detection device for detecting whether or not the first and second video apparatus are connected to each other in order to transmit and receive a video signal.

To accomplish the above object, there is provided a paid broadcast receiving device in a video cassette recorder (VCR) which includes a paid broadcast decoder for converting a scrambled paid broadcast signal into an unscrambled signal for normal reception, the paid broadcast receiving device comprising:

first switching means for performing a switching operation such that an input terminal of the paid broadcast decoder is connected to an output terminal of a VCR demodulator or to an output terminal of a television demodulator;

second switching means for performing a switching operation such that an input terminal of a VCR video signal processor is connected to the output terminal of the VCR demodulator, to the output terminal of the television demodulator, or to the output terminal of the paid broadcast decoder;

third switching means for performing a switching operation according to a VCR/TV select mode control signal, whose output terminal is connected to an output terminal of the VCR video signal processor in a VCR mode and is connected to an output terminal of the paid broadcast decoder in a television mode;

fourth switching means for performing a switching operation such that an input terminal of a television video signal processor is connected to an output terminal of the television demodulator or to the output terminal of the third switching means;

decoder connection detecting means connected to the output terminal of the first switching means so as to detect whether or not the paid broadcast decoder is connected to the VCR depending on an impedance matching and outputting a detection signal; and controlling means for discriminating between a VCR/TV mode and a paid broadcast/general broadcast mode and for controlling the second switching means according to the detection signal so that the second switching means selects the output of the VCR demodulator when a paid broadcast signal is received in the VCR mode and selects the output of the TV demodulator when a paid broadcast signal is received in the TV mode, in order to output the selected output to a television via the third switching means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
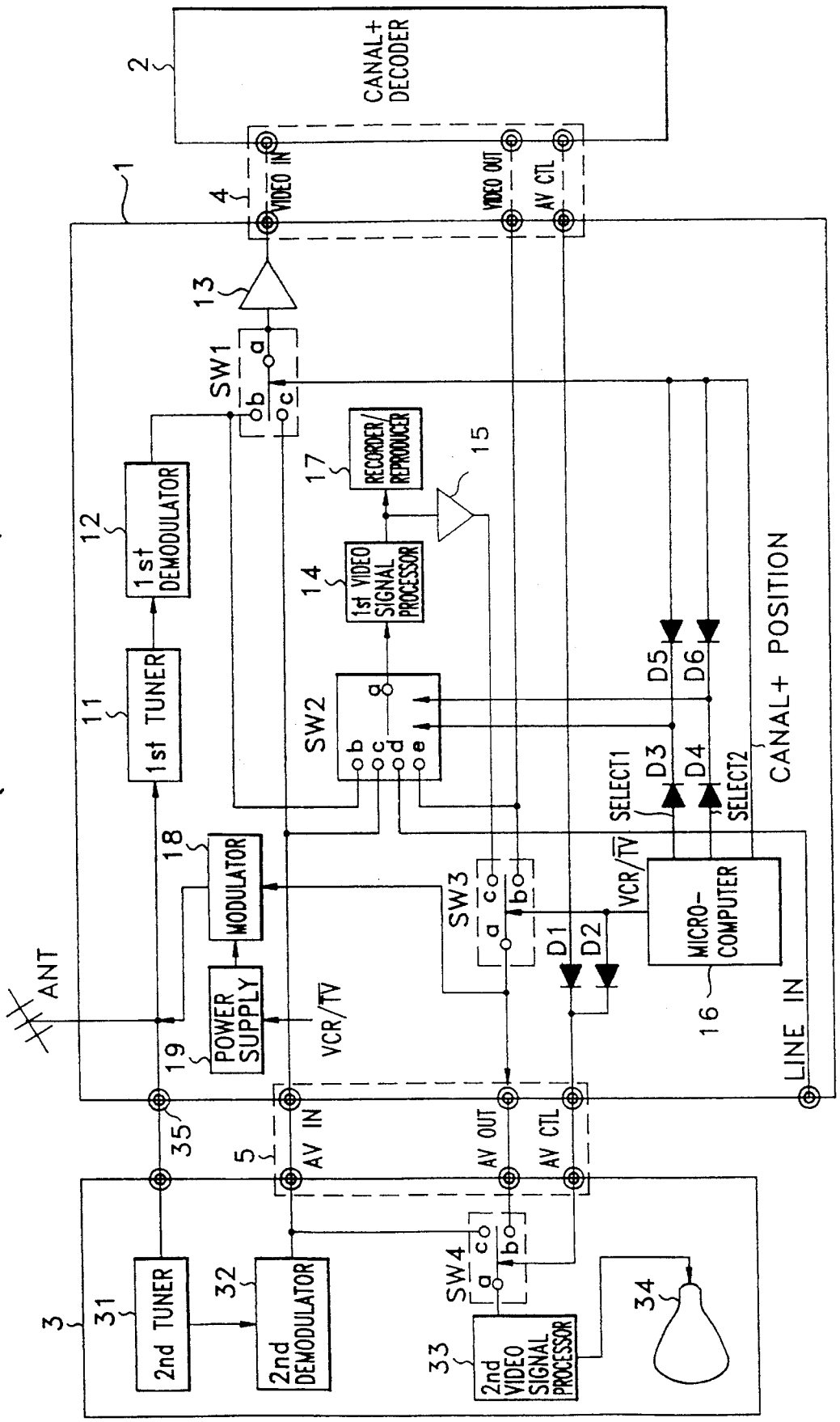
FIG. 1 is a block diagram of a conventional paid broadcast receiving device.

An embodiment of a paid broadcast receiving device of the present invention will be explained with reference to the attached drawings, wherein like components as those of FIG. 1 will be numbered the same and their corresponding explanations will be omitted.

Figure 2:
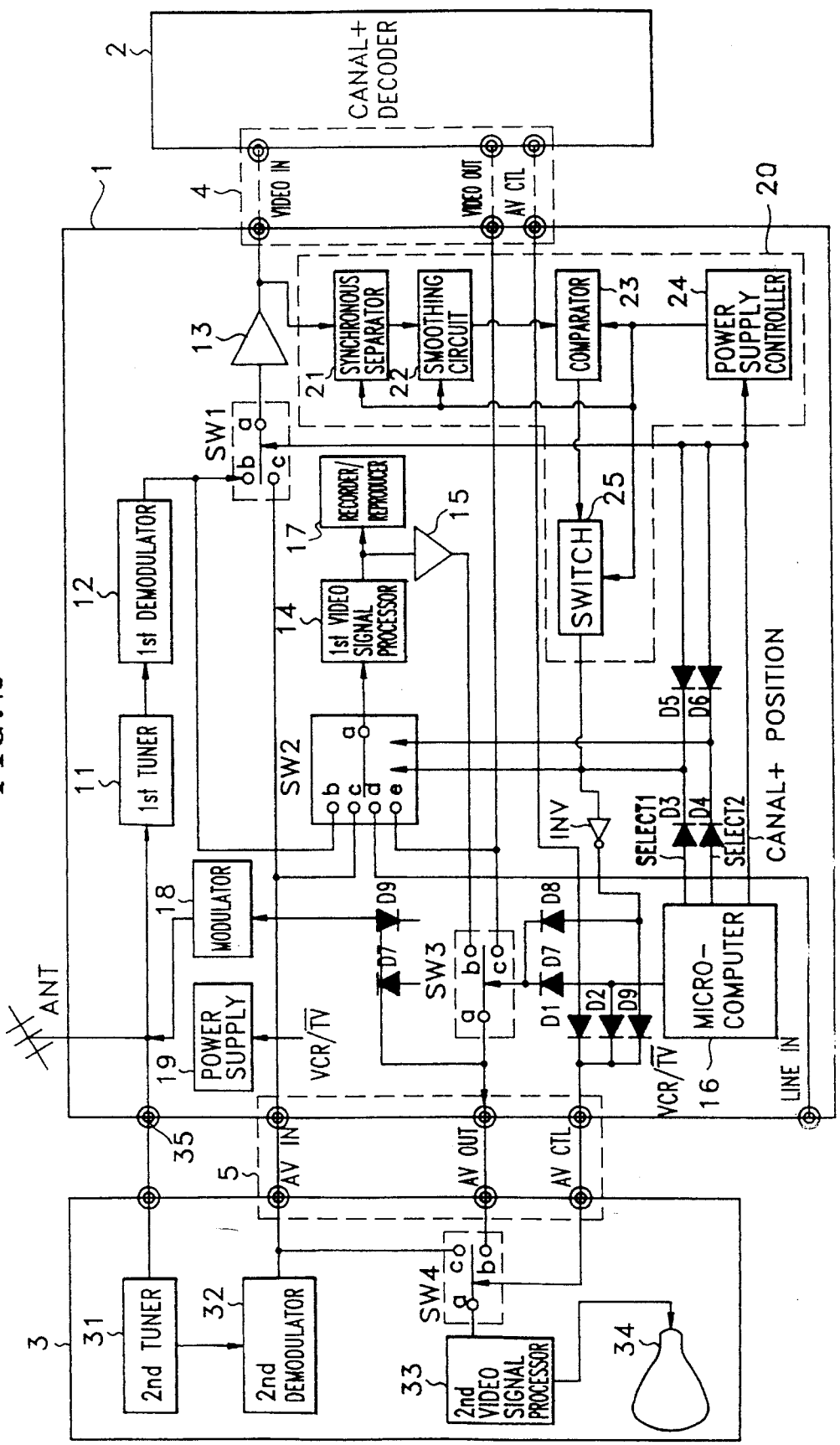
FIG. 2 is a block diagram of an embodiment of a paid broadcast receiving device according to the present invention.

Referring to FIG. 2, a decoder connection detector 20 includes a synchronous separator 21 connected to the output of first amplifier 13, a smoothing circuit 22 connected to the output of synchronous separator 21, a comparator 23 connected to the output of smoothing circuit 22, a switch 25 connected to the output of comparator 23 and constituted by transistors, and a power supply controller 24 for controlling the power supply for synchronous separator 21, smoothing circuit 22, comparator 23 and switch 25. An inverter INV is connected to the output of switch 25, a diode D7 is connected between the VCR/TV mode control signal output port of microcomputer 16 and the control terminal of third switch SW3, a diode D8 is connected between the output of inverter INV and the control terminal of third switch SW3, and a diode D9 is connected between the output of inverter INV and the output of microcomputer 16.

The device shown in FIG. 2 operates as follows.

A paid broadcast receiving device of the present invention performs modes (1) to (5) described above with respect to FIG. 1.

First, in the case of receiving a canal+ broadcast signal in the VCR mode, when a user purchases a VCR and presets an initial broadcast channel, the canal+ position channel is specifically stored with respect to a canal+ broadcast channel. If the stored canal+ position channel is selected, the canal+ position signal goes "high." With a "high" canal+ position signal, first switch SW1 is connected to contact "b" so that a video signal input via VCR tuner 11 passes through first amplifier 13 and is input to the video input terminal of canal+ decoder 2. Also, when the canal+ position signal is "high," second switch SW2 is connected to contact "e" according to the outputs from the first and second selection control ports of microcomputer 16, which are both "high," to thereby select the unscrambled video signal of canal+ decoder 2.

At this time, decoder connection detector 20 detects whether or not canal+ decoder 2 is connected to VCR 1. If canal+ decoder 2 is not connected to VCR 1, the first selection signal for controlling second switch SW2 is forced "low" so as to select the video signal which passes through first tuner 11 of VCR 1. As a result, the scrambled canal+ broadcast signal is received, which allows the user to easily judge whether or not canal+ decoder 2 is connected. Further, the user can receive or record general programming among canal+ broadcasts.

This will be explained in more detail, as follows, beginning with the case of receiving a canal+ broadcast signal in the VCR mode.

(i) With the VCR and canal+ decoder connected:

When the canal+ position channel is selected and the canal+ position signal is "high," power supply controller 24 supplies the power which turns on synchronous separator 2, smoothing circuit 22, comparator 23 and switch 25, that is, to each component of decoder connection detector 20. When the power supplied to decoder connection detector 20 and canal+ decoder 2 is properly connected, the amplitude of the sync signal through synchronous separator 21 and smoothing circuit 22 and input to comparator 23 is 0.3 Vp-p, due to the impedance match of VCR 1 and canal+ decoder 2, given the standard video signal of 1Vp-p.

That is, the sync signal amplitude is compared with a predetermined reference voltage (0.45V) in comparator 23. If the synchronous signal is smaller than the reference voltage, a logic "low" control signal is output to keep switch 25 in the "off" state so that the output of switch 25 is held "high." This signal is inverted to a "low" through inverter INV and input to diode D8. However, diode D8 is turned off and does not affect the switching operation of switch SW3. Then, second switch SW2 is set to contact "e" by the "high" output of switch 25 and the "high" selection control signals from microcomputer 16, to thereby select the output of canal+ decoder 2.

(ii) With the VCR and canal+ decoder disconnected:

In this case, the amplitude of the sync signal which passes through synchronous separator 21 and smoothing circuit 22 and is input to comparator 23 is 0.6Vp-p, i.e., double that of the above-described case (i), due to the open-circuit impedance with respect to the canal+ decoder 2. Thus, the amplitude is larger than the reference voltage in comparator 23. Therefore, a logic "high" signal is output so as to turn on switch 25. With switch 25 turned on, its output signal goes low, which thereby forces the first selection control signal output from microcomputer 16 to a "low" state. If the selection control signals input to second switch SW2 are "low" and "high," respectively, second switch SW2 is connected to contact "b" so as to select a video signal which passes through VCR tuner 11. Accordingly, a scrambled canal+ broadcast signal or a general broadcast signal among canal+broadcast signals can be received even without having a canal+ decoder 2 connected.

At this time, the output of switch 25 is "low" and is subsequently inverted (logic "high") via inverter INV to be input as the control signal of third switch SW3 via diode D8. However, since third switch SW3 is connected to contact "c" by the "high" VCR mode control signal output from microcomputer 16, its switching operation is not changed by the "high" from inverter INV.

Now, the case of receiving a canal+ broadcast signal in the television mode will be explained.

(iii) With the VCR and canal+ decoder connected:

The canal+ broadcast signal received in TV tuner 31 is unscrambled by canal+ decoder 2 via first switch SW1. As a result, the unscrambled canal+ broadcast signal is received at television 3 via second switch SW2 connected to contact "c," third switch SW3 connected to contact "b," and fourth switch SW4 connected to contact "b." Here, the operation of decoder connection detector 20 is the same as in the above case (i) where the canal+ broadcast signal is received in a VCR mode. As above, the output signal of switch 25 is "high" and is inverted into a "low" signal through inverter INV and then input to diode D8. However, diode D8 is turned off so that the switching operation of third switch SW3 is not affected.

(iv) With the VCR and canal+ decoder disconnected:

Decoder connection detector 20 operates the same as in the above case (i). At this time, the output signal of switch 25 is "low" and is inverted to a logic "high" via inverter INV to be input as the control signal of third switch SW3 via diode D8. Since third switch SW3 is connected to contact "b" by the "low" TV mode control signal output from microcomputer 16, the "high" output signal of inverter INV sets third switch SW3 to contact "c" via diode D8.

Accordingly, canal+ broadcasts input to second tuner 31 is output to first video signal processor 14 via the AV input terminal and second switch SW2 connected to contact "c", and the output of first video signal processor 14 is received at television 3 via third switch SW3 connected to contact "c" and the AV output terminal.

Further, if power is not supplied to the VCR, first video signal processor 14 and second amplifier 15 do not operate. Therefore, "standby" power has to be supplied whenever receiving canal+ broadcasts in the TV mode.

A decoder connection detector of the present invention can be used in a device for detecting whether or not first and second video processing apparatuses are connected in order to receive the processed video signal.

As described above, a paid broadcast receiving device of the present invention can detect whether or not a VCR is connected to a canal+ decoder for receiving the scrambled canal+ broadcast signal when a canal+ broadcast signal is received in a VCR or TV mode, even if the VCR and canal+ decoder are not interconnected. As a result, users can easily judge whether or not the VCR and canal+ decoder are connected, and the general broadcasts among canal+ broadcasts can be received and/or recorded.

What is claimed is:

1. A paid broadcast receiving device in a video cassette recorder (VCR) which includes a paid broadcast decoder for converting a scrambled paid broadcast signal into an unscrambled signal for normal reception, said paid broadcast receiving device comprising:

first switching means for performing a switching operation such that an input terminal of said paid broadcast decoder is connected to one of an output terminal of a VCR demodulator and an output terminal of a television demodulator;

second switching means for performing a switching operation such that an input terminal of a VCR video signal processor is connected to one of said output terminal of said VCR demodulator, said output terminal of said television demodulator, and said output terminal of said paid broadcast decoder;

third switching means for performing a switching operation according to a VCR/TV select mode control signal, whose output terminal is connected to an output terminal of said VCR video signal processor in a VCR mode and to an output terminal of said paid broadcast decoder in a television mode;

fourth switching means for performing a switching operation such that an input terminal of a television video signal processor is connected to one of an output terminal of said television demodulator and the output terminal of said third switching means;

decoder connection detecting means connected to an output terminal of said first switching means so as to detect whether or not said paid broadcast decoder is connected to the VCR, depending on an impedance matching, and outputting a detection signal; and controlling means for discriminating between a VCR/TV mode and a paid broadcast/general broadcast mode and for controlling said second switching means according to said detection signal so that the second switching means selects said output of said VCR demodulator when a paid broadcast signal is received in the VCR mode and selects said output of said TV demodulator when a paid broadcast signal is received in the TV mode, in order to output the selected output to a television via said third switching means.

2. A paid broadcast receiving device according to claim 1, wherein said decoder connection detecting means comprises:

a synchronous separator for separating a sync signal of a video signal which has been output by said first switching means and amplified by an amplifier;

a smoothing circuit for receiving as input an output of said synchronous separator and outputting the received input as a direct current signal;

a comparator for receiving an output of said smoothing circuit and comparing the output of said smoothing circuit with a predetermined reference level; and fifth switching means for generating a detection signal in accordance with the result of said comparison;

wherein a connection between the VCR and the paid broadcast decoder is determined in correspondence with an amplitude change of a video signal output by the amplifier depending on an impedance match between an output terminal of the amplifier and an input terminal of said paid broadcast decoder.

3. A paid broadcast receiving device according to claim 2, wherein said controlling means controls said second switching means when a paid broadcast signal is received in a VCR mode so that said second switching means selects the output of said VCR demodulator in response to the output signal of said fifth switching means which is representative of the absence of a connection between the VCR and the paid broadcast decoder.

4. A paid broadcast receiving device according to claim 2, wherein said controlling means controls said second and third switching means when a paid broadcast signal is received in a TV mode so that said second switching means selects the output of said VCR demodulator in response to an output signal of said fifth switching means which is representative of the absence of a connection between the VCR and the paid broadcast decoder, and so that said third switching means selects an output of said VCR video signal processor.

5. A connection detecting device including a first video processing apparatus which has an amplifier for amplifying a processed video signal and at least one output terminal and a second video processing apparatus which has at least one input terminal for receiving a video signal output from said at least one output terminal, and which detects whether or not said first and second video processing apparatuses are connected, said connection detecting device comprising:

a synchronous separator connected to an output terminal of said first video processing apparatus so as to isolate a sync signal of said video signal;

a smoothing circuit for receiving an output of said synchronous separator and for outputting the received input as a direct current signal;

a comparator for receiving the output signal of said smoothing circuit and comparing the received output signal with a predetermined reference level; and means for generating a comparison control signal in accordance with the result of said comparison;

wherein a connection between said first and second video processing apparatuses is determined in correspondence with an amplitude change of the signal input to said synchronous separator depending on an impedance match between an output terminal of said first video processing apparatus and an input terminal of said second video processing apparatus.

* * * * *